United States Patent [19]
Collins

[11] Patent Number: 5,786,863
[45] Date of Patent: Jul. 28, 1998

[54] HIGH RESOLUTION RECORDING AND TRANSMISSION TECHNIQUE FOR COMPUTER VIDEO AND OTHER NON-TELEVISION FORMATTED VIDEO SIGNALS

[75] Inventor: Galen Collins, San Jose, Calif.

[73] Assignee: Redlake Imaging Corporation, Mogan Hill, Calif.

[21] Appl. No.: 512,634

[22] Filed: Aug. 8, 1995

[51] Int. Cl.[6] ............................................. H04N 7/01
[52] U.S. Cl. ................................ 348/458; 348/441
[58] Field of Search ........................... 348/441, 445, 348/448, 458, 443, 444, 447

[56] References Cited

U.S. PATENT DOCUMENTS 4,872,054  10/1989  Gray et al. ............................ 348/441
5,526,055  6/1996  Zhang et al. ......................... 348/453

Primary Examiner—Victor R. Kostak
Attorney, Agent, or Firm—Allston L. Jones

[57] ABSTRACT

An electronic format converter that can convert a high resolution computer graphics CRT signal to a quasi-television compatible proprietary signal. This subsequently can be recorded to a standard television video cassette recorder (VCR) or transmitted over a standard TV channel and re-converted back to HI-RES computer video with the same device upon playback of the VCR or receipt of the signal from the standard TV channel.

8 Claims, 4 Drawing Sheets

HIGH RESOLUTION RECORDING AND TRANSMISSION TECHNIQUE FOR COMPUTER VIDEO AND OTHER NON-TELEVISION FORMATTED VIDEO SIGNALS

FIELD OF THE INVENTION

This invention relates to the conversion of standard computer video signals to standard television signals that can be recorded on a standard television VCR (Video Cassette Recorder) tape without loss of resolution of small features of the image, and the ability to convert such a recorded video signal back to the original computer video signal without any appreciable loss of resolution.

BACKGROUND OF THE INVENTION

Computer video displays generally utilize different scan rates and timing than television video displays. As a result of these differences, commercial TV video tape recorders are not suitable for the recording of computer video. To address the need to record computer video, scan converters are presently employed to convert the higher resolution computer video down to the resolution of television.

This conversion is accomplished with scan converters being employed to filter and resample the computer video signal in two dimensions (horizontal and vertical) to produce a signal of identical timing to a television signal. In doing so, the frame rate of the resulting television signals is kept approximately, or exactly, the same as that of the computer video signal with the conversion sacrificing video resolution to achieve the timing for television. The result of this type of scan conversion is that small objects and, in particular, text are rendered so poor as to be largely illegible in the final output to a TV screen.

In scan converters of this type, the HI-RES (high-resolution) computer video image is reduced in line count by either dropping lines selectively, or filtering, or averaging, to reduce the line count to that of a TV field. Thus, for example, a computer image of 1000 by 1000 pixels would be reduced to only 242 lines to generate a standard NTSC (North American TV Standards Committee) field or 288 lines to generate a standard PAL (Phase Alternated Line) field. This loss of information causes text and small graphics objects to become so blurred that they are not legible in the final result.

Further, the production of a tape recorder that could directly record the output of a computer video system is prohibitively expensive, since there are so many different computer video formats. Each would largely require its own design effort. Moreover, compatibility with standard VCR tapes would probably be sacrificed, since wider tape formats would probably be required to handle the much greater bandwidth of computer video.

It would be advantageous to be able to convert any standard computer video signal to standard television signals that could be recorded on a standard television VCR (Video Cassette Recorder) tape without loss of resolution of small features of the image. It would also be advantageous if the image could be converted back to the original computer video signal without any appreciable loss of resolution. The present invention provides such a technique.

SUMMARY OF THE INVENTION

In accordance with the present invention there is disclosed a scan conversion technique and apparatus that acquires a high resolution computer video frame at a high rate of speed and places it into a digital memory. This memory is then read out at a substantially lower speed to produce a spreading in time of the original high resolution computer video frame signal. With the spreading of the signal there is a subsequent lowering of the bandwidth of the signal in proportion to the amount of the spread. For example, a spread of 1:5 will reduce the bandwidth to ⅕ of the original bandwidth. The present invention also provides for the reconversion back to the original computer video signal with little loss of resolution.

DESCRIPTION OF THE PRESENT INVENTION

Figure 1:
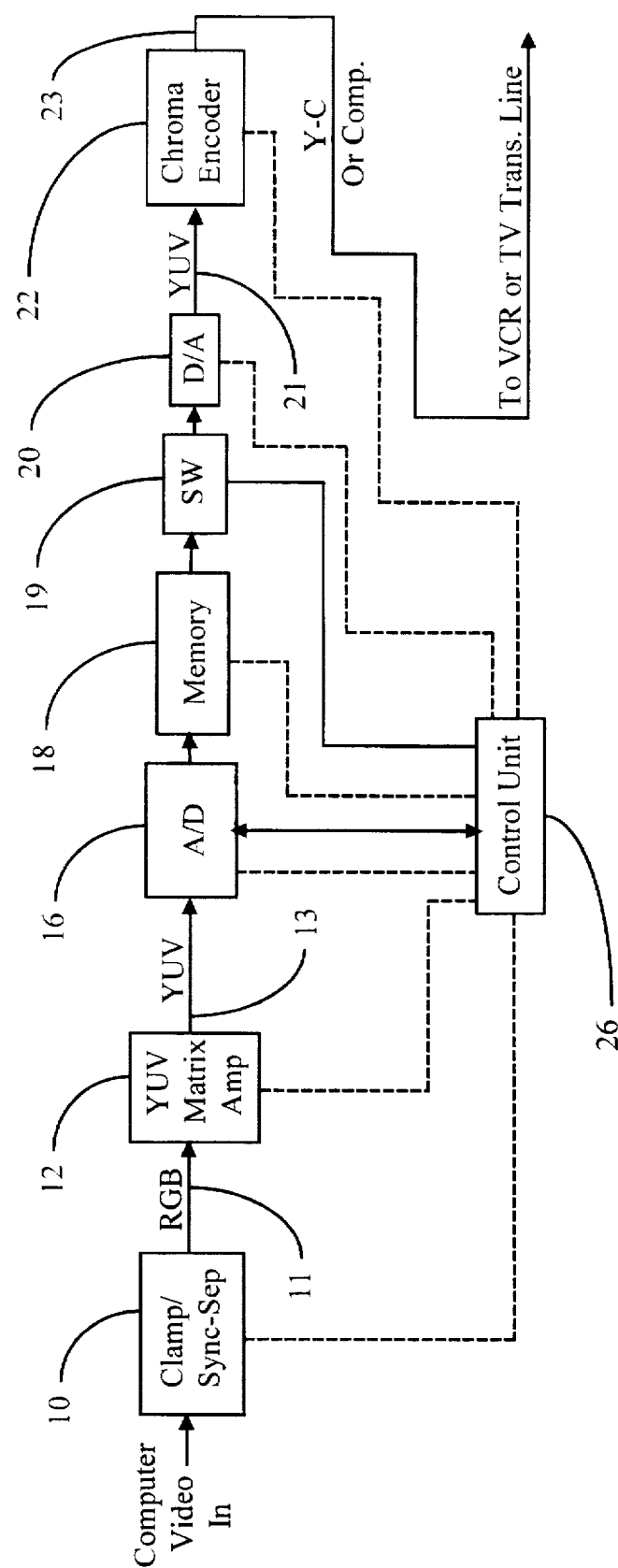
FIG. 1 is a simplified block diagram of the schematic of the present invention to convert computer video signals for recording on a standard VCR or for TV transmission.

As an example of the problem to be overcome, the recording of RADAR screen images in an aviation application does not need a high frame rate recording to VCR tape, since the image changes very slowly as the airplane moves through the air. However, the recorded signal must have good resolution so that the numbers displayed with each blip up-dating the image can be read later for identification purposes. This is only one of many examples that provide the motivation for devising the present invention.

To overcome the problems of the prior art where information is lost, the present invention minimizes the actual loss of information by the elimination of some frames of the signal to allow full resolution images to be stored on standard VCR video tape. As will be seen more clearly below, that is accomplished by spreading a computer video frame over several TV fields. Many of the applications that include the recording of computer screens can tolerate this tradeoff.

To accomplish that result, the present invention utilizes spread technology so that standard VCR tape recorder technology can be used to store high resolution computer video frames spread over several television frames to maintain substantially all of the resolution of the original computer video signal. Using the same technique, the computer video information can be spread for transmission over a standard TV data channel. As will be seen from the following discussion, a standard VCR tape having such a non-standard signal recorded thereon when played back through the present invention produces substantially the original computer video signal duplicating frames a multiplicity of times to restore the original higher frame rate. Similarly, such a transmitted TV signal can be converted back at the receiving end of that TV signal.

The technique of the present invention differs from the prior art scan converters in that the present invention retains all of the vertical resolution as the computer video signal is converted to and from TV format. Since many applications do not require every frame to be recorded (e.g., 60 frames/sec for computer video refresh) a lower rate (e.g., 12 frames/sec. which is supportable by standard TV technology) is acceptable. particularly if this spread signal preserves the detail of small text and graphical objects. As will be seen from the discussion below, when the TV video signal is reconverted to the computer video display the removed frames are reinserted to convert a 12 frame/sec signal back to the 60 frame/sec signal to restore compatibility with the original computer video signal.

The technique of the present invention can for simplicity be referred to as "spreading", since the computer video frame is "spread" to cover several frames in the television format. This allows all of the original lines from the computer display to be retained in the TV format by elimination of some frames of the signal, thus keeping all of the original vertical resolution of the HI-RES computer video signal.

A typical example of the differences between a computer video signal and a TV video signal are illustrated in the following Table.

| Computer pixel clock frequency: | 60 Mhz |
|---|---|
| Television pixel clock frequency: | 14 Mhz |
| Computer video bandwidth: | ≈30 Mhz |
| Television video bandwidth: | <7 Mhz |
| Approximate ratio of bandwidths: | 4.3 |
| Number of lines in computer video: | 1024 |
| Number of lines in television field: | 242 |
| Approximate ratio of vert. lines: | 4.2 |
| Spread required: | ≈1:5 |
| Actual VCR recorded frame rate | 12 frames/sec |

Note: the spread factor in the present invention is shown here in integer values. It need not be integer in the general case however, it could be 1:4.2 or 4.3. As the example above shows, the spread factor required to preserve all of the lines is about equal to the spread factor required to lower the horizontal bandwidth to that of a good quality video tape recorder. Thus both dimensions of the original picture are approximately preserved onto the tape.

Figure 4A:
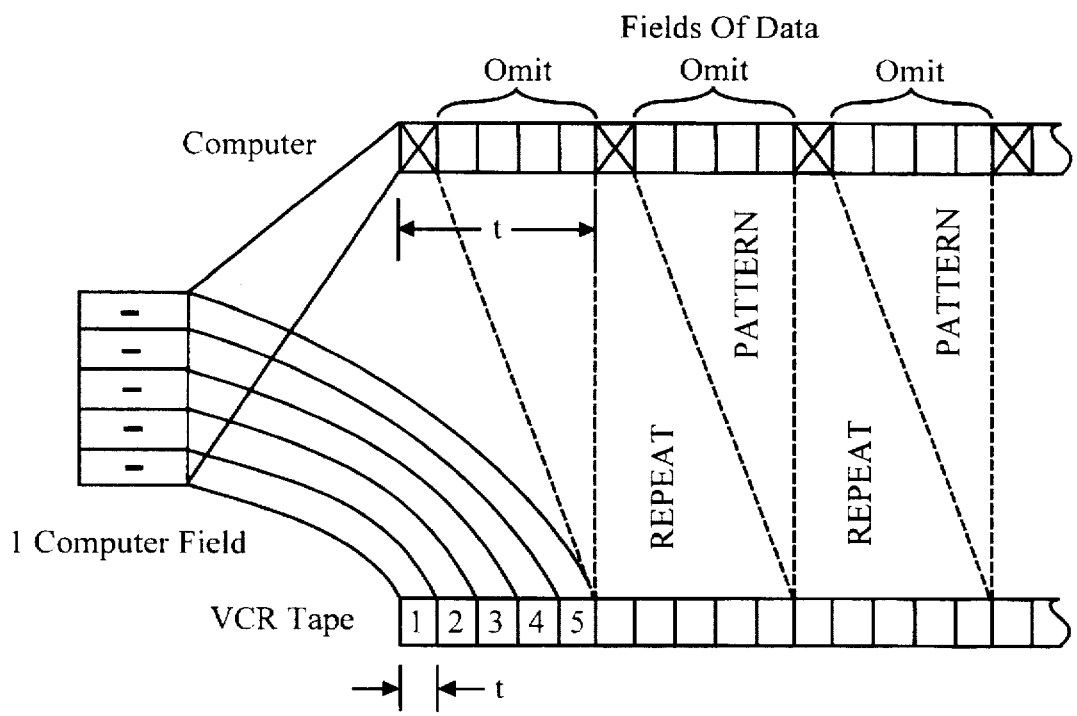
FIG. 4a is a conceptual representation of one method of the present invention for the conversion of computer video to TV signals for recording on VCR tape or TV transmission.

There are two methods of the present invention for the spreading of the field data of a computer video signal to be recorded on standard VCR tape. FIG. 4a illustrates one method of the present invention for the spreading of the data. Along the top of FIG. 4a there are represented a series of computer video frames, with 5 frames occurring within a period of time t. Similarly, along the bottom of FIG. 4a there are a series of TV or VCR frames represented with one frame occurring within the same period of time, t. To the left side of these two data frame representations there is a blow-up of a single computer video frame.

Since five frames of the computer video signal occur in the same time period that one TV or VCR frame occurs, the data in the first computer video frame is spread among five consecutive TV or VCR frames. Then the data in the next four computer video frames is ignored, or omitted. Then the sixth computer video frame data is spread into the second consecutive five TV, or VCR, frames. The pattern is then repeated over and over again in the same way.

More specifically, lines 1–205 from the first computer frame are spread to VCR frame 1, lines 206–410 from the first computer frame are spread to VCR frame 2, lines 411–615 from the first computer frame are spread to VCR frame 3, lines 616–820 from the first computer frame are spread to VCR frame 4, and lines 821–1024 from the first computer frame are spread to VCR frame 5.

Thus, by spreading the computer video data in this way, if there is any motion between frames in the computer video, there will not be any blurring of the data spread from the single frame of the computer video into the five frames of the VCR video.

The reconversion using the method of conversion illustrated by FIG. 4a is simply the reverse operation, with each of the first five frames of the computer video being recreated by transferring the data in the first VCR frame repeatedly to the first five computer video frames as lines 1–205 in each computer video frame, the second VCR frame repeatedly to the first five computer video frames as lines 206–410 in each computer video frame, the third VCR frame repeatedly to the first five computer video frames as lines 411–615 in each computer video frame, the fourth VCR frame repeatedly to the first five computer video frames as lines 616–820 in each computer video frame, and the fifth VCR frame repeatedly to the first five computer video frames as lines 821–1024 in each computer video frame. The pattern is then repeated for the next five frames, then the next five frames, ad infinitum.

Figure 4B:
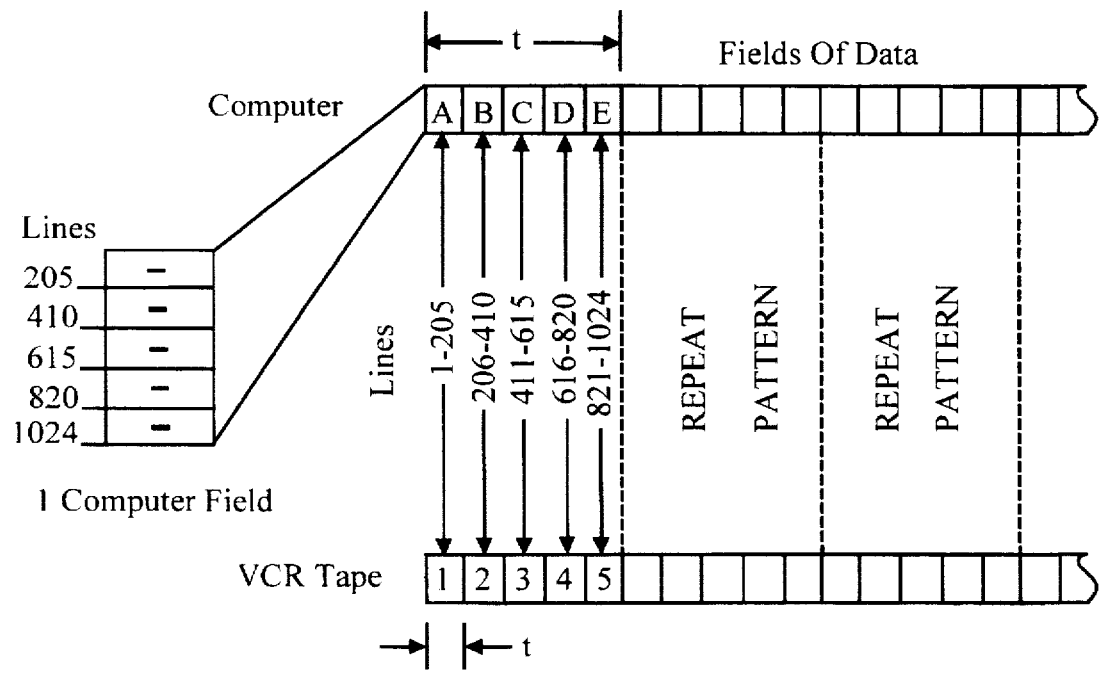
FIG. 4b is a conceptual representation of another method of the present invention for the conversion of computer video to TV signals for recording on VCR tape or TV transmission.

FIG. 4b illustrates another method of the present invention for the spreading of the data, for use where the possibility of any motion occurring within five computer video frames is quite small (e.g., where the refresh rate of the video image is very slow). Along the top of FIG. 4b there are a series of computer video frames represented with 5 frames occurring within a period of time t, and to the left there is shown a computer frame with the 1024 lines therein divided into five groups of lines 1–25, 206–410, 411–615, 616–820, and 821–1024. Similarly, along the bottom of FIG. 4 there are a series of TV or VCR frames represented with one frame occurring within the same period of time, t.

In the method of FIG. 4b lines 1–205 from computer frame A is written to VCR frame 1, lines 206–410 from computer frame B is written to VCR frame 2, lines 411–615 from computer frame C is written to VCR frame 3, lines 616–820 from computer frame D is written to VCR frame 4, and lines 821–1024 from computer frame E is written to VCR frame 5. This pattern is then repeated for each subsequent set of five frames in each of the computer and VCR video signals.

Then, in the reconversion direction, the data of VCR frame 1 is written into each of computer frames A–E as lines 1–205, the data of VCR frame 2 is written into each of computer frames A–E as lines 206–410, the data of VCR frame 3 is written into each of computer frames A–E as lines 411–615, the data of VCR frame 4 is written into each of computer frames A–E as lines 616–820, and the data of VCR frame 5 is written into each of computer frames A–E as lines 821–1024. The reconversion process is thus similarly repeated for each five frame combination of both the VCR and computer video signals.

Thus, it may be seen that the present invention provides an improvement in the spatial resolution of the video (i.e., the image's visual clarity) over the prior art. The present invention accomplishes this improvement at the expense of temporal resolution of the video (i.e., frames of content per unit time). As discussed above, there are a number of applications for which this is an advantageous tradeoff.

An embodiment of a circuit which makes it possible to record the content of computer screens to VCR video tape or to convert the image to TV signals for transmission using the techniques presented above is illustrated in FIG. 1. First, the computer video signal, an analog signal, is shown being applied to a clamp/sync separator 10 which is typically implemented with a combination of a clamp (e.g., an Elantec EL 4390 clamp) and a synchronization separator (e.g., an LM 1881 sync separator). Clamp/sync separator 10 clamps the DC (direct current) levels of the computer video input signals and performs synchronization (sync) separation on those signals.

The signals from clamp/sync separator 10 are three analog signals, and since computer video is generally in RGB (red-green-blue) format, the signals from clamp/sync separator 10 are also in RGB format. In addition, the sync separated signals are also directed to control unit 26 on lines 11 with control unit 26 implemented by a combination of a microprocessor (e.g., Motorola 68HC11) and a PLD (e.g., Altera 81188).

The next step performed here is the conversion of the RGB formatted signals from clamp/sync separator 10 to YUV format, an intermediate format to that used in TV signals, where Y, U and V are standard components for making broadcast video. YUV format is also known as Y, B-Y, R-Y format. Since the amount of information in the TV signal format is less than in the RGB format of the computer, the necessary conversion is performed at this point to reduce the amount of memory needed later for the frame spreading operation. Thus, it should be noted that this format conversion operation is done here simply for convenience and could have been done anywhere prior to the final presentation of the signal to the TV transmission line or VCR equipment.

The RGB-YUV conversion is performed by YUV matrix amplifier 12 which is well known in the art and utilizes a matrix of selected resistors and amplifiers to create the three YUV signals.

The output signals on lines 13 from YUV matrix amplifier 12 now have the video information from the computer in YUV format, and are provided to Analog to Digital (A/D) converter 16 to convert the analog YUV formatted signals to digital form. One implementation of A/D converter 16 might be the use of three 8 bit converters, one for each color signal (Y, U and V), to yield a 24 bit wide output signal.

The digitized YUV signals are then applied to frame memory 18, which is sized to accommodate at least one frame of digitized data of computer video (e.g., at a sample rate of 60 MHz that is approximately 3 Megabytes), and operates under control of control unit 26. In the present example, a frame is one screen of picture from the computer and takes approximately 17 msec to write into memory 18, for a screen refresh rate of 60 Hz.

For the operational format discussed with respect to FIG. 4a, data is written into memory 18 at the beginning of a frame and continues linearly until a complete frame of data is entered into memory 18, then control unit 26 inactivates the input to memory 18 so that the next selected number of frames of data from the computer are not written into memory 18 to implement the selected spread factor (e.g., if the spread factor is 1:5 four frames of data are blocked from being written into memory 18).

Alternatively, for the operational format discussed with respect to FIG. 4b, the data within five frames of computer video is spread into five frames of TV video by writing lines 1–205 from the first frame of computer video into memory 18 for the first frame of TV video, then by writing lines 206–410 from the second frame of computer video into memory 18 for the second frame of TV video, then by writing lines 411–615 from the third frame of computer video into memory 18 for the third frame of TV video, then by writing lines 616–820 from fourth frame of computer video into memory 18 for the fourth frame of TV video, and then by writing lines 821–1024 from fifth frame of computer video into memory 18 for the fifth frame of TV video. This pattern is then repeated for each subsequent set of five frames in each of the computer and TV video signals. Thus accomplishing the 5:1 spread in an alternative manner.

Since the TV frame rate is slower than the computer video frame rate, writing into memory 18 occurs at a higher rate than the reading from memory 18, thus reading may start at any time after writing has begun without overlapping or depleting memory 18 of data. In this example, the reading of data from memory 18 will require substantially all of the time of the five input frames to read out the one frame from memory 18, with the data being read out also having a digitized YUV format. The blanking time at the end of the reading out of data may be used to resynchronize the reading and writing.

The spread data from memory 18 then passes through a digital data insertion switch 19 to insert a first line of data that inserts parameters of the spread and which spread method is used into the data stream under the control of the PLD of control unit 26. Other than the addition of the first line of data, digital data insertion switch 19 does not alter the data being read-out of memory 18. All of the data from switch 19 is then converted to analog form by Digital to Analog (D/A) converter 20. Here, using the implementation suggested above, the 24 digital lines are converted to three analog lines in analog YUV format as signal path 21.

The signals in path 21 are then directed to chroma encoder 22. Chroma encoder 22 is provided to make the final conversion of the YUV formatted data to Y-C, or a composite, format, the typical format for TV transmission. This is done by combining the Y, U and V signals to produce a composite video signal for transmission on a single wire or Y-C video for transmission on two wires. Thus these signals are now formatted to be sent to a VCR or to be sent down a TV transmission channel. With this step the down conversion is complete.

Figure 2:
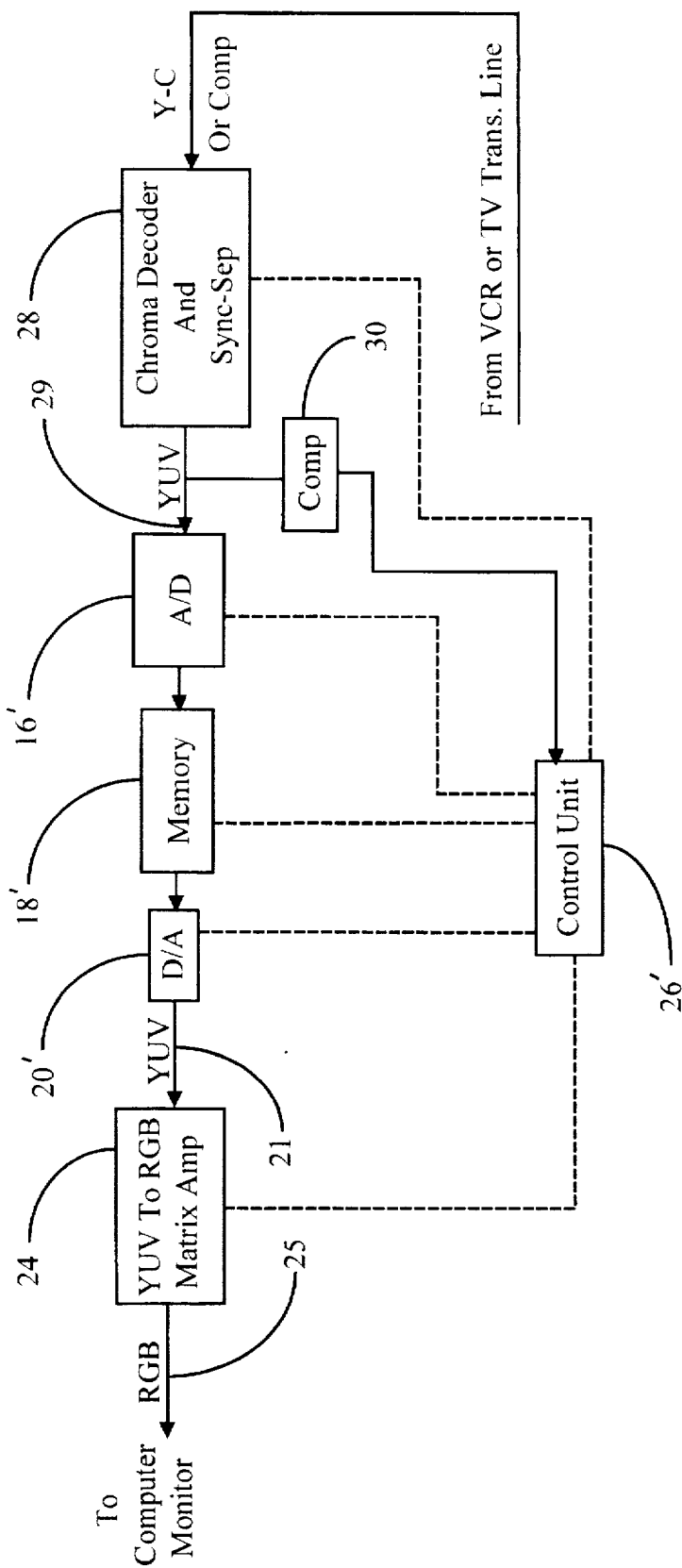
FIG. 2 is a simplified block diagram of the schematic of the present invention to reconvert the computer video signals recorded on a standard VCR or a TV transmission created by a convert as illustrated in FIG. 1 back to computer video signals for display on a computer monitor.

An embodiment of a circuit which performs an up-conversion, thereby permitting playback of a computer screen saved or provided for TV transmission by the circuit illustrated in FIG. 1 is shown in FIG. 2. This circuit similarly includes a control unit 26' that is implemented by a combination of a microprocessor (e.g., Motorola 68HC11) and a PLD (e.g., Altera 81188).

To reconvert the signal from the VCR or TV transmission line format, the Y-C or composite signal of an image is directed to chroma decoder and sync separator 28 (e.g., Sony CXA 1228S), to generate the YUV signals by an operation that is well known in the art. Under control of the PLD of control unit 26', analog comparator 30 in-turn examines the incoming Y signal to determine if it includes digitally (format) encoded computer scan parameters that were added in the record path by digital data insertion switch 19 of the present invention discussed with respect to FIG. 1. That code is necessary to determine the timing that is needed during the re-generation operation of the playback phase. Without a match from analog comparator 30, control unit 26' does not proceed with the reconversion.

From chroma decoder and sync separator 28, the reconstructed YUV signals are applied to A/D converter 16', which operates in the same way as does A/D converter 16 described above in FIG. 1, (i.e., the record operational phase). From A/D converter 16' under control of control unit 26', one frame of information is written into memory 18' as described above for memory 18 in the record phase.

However, unlike during the record phase, the data is read repeatedly from memory 18', under control of control unit 26', the requisite number of times to recreate the frames of information that were deleted during the spreading operation of the record phase of operation. The frame data is read five times from memory 18' to recreate five frames of computer video before the next frame of data is written into memory 18' for the reverse technique of either of the techniques of FIGS. 4a and 4b.

As the data is read from memory 18', it is directed to D/A converter 20' (which is similar to D/A converter 20 in FIG. 1) for conversion to analog data, still in YUV format, and is directed to YUV to RGB chroma matrix amplifier 24 to convert the signal format to a computer video compatible signal in RGB format with a matrix of selected resistors and amplifiers.

The final step is the linking of the signals in path 25 to the computer monitor (not shown), thus playing back the recorded video or TV transmitted video to the computer monitor.

It would be advantageous to combine the circuits of FIGS. 1 and 2 together to provide a combined recorder/playback unit, thereby sharing elements to allow multiple uses for those elements that perform the same function in both directions. The combined use of circuitry in the record and playback paths saves parts and costs over the use of two separate and distinct circuits, one for each direction.

Figure 3:
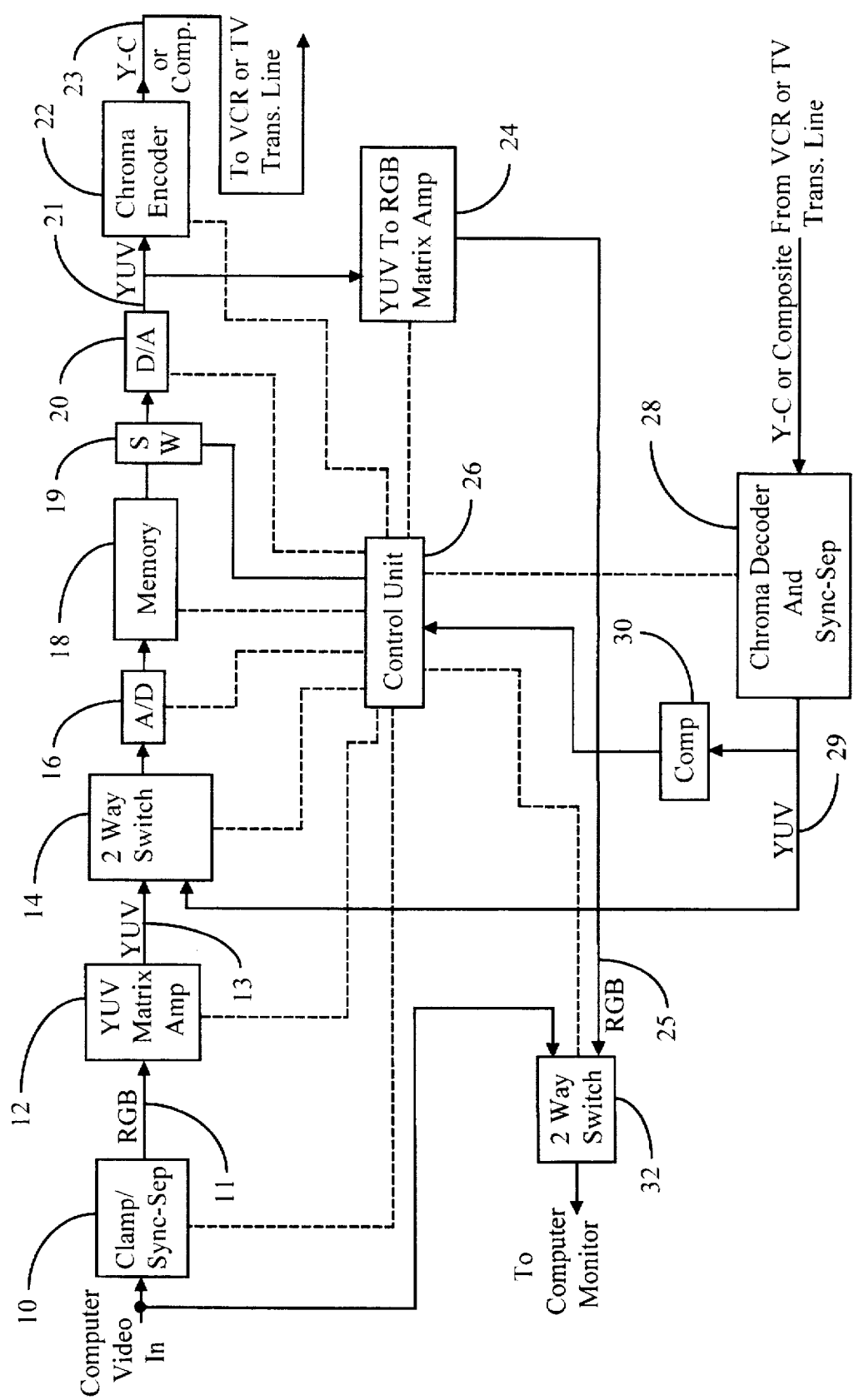
FIG. 3 is a simplified block diagram of a schematic for the combined functions of FIGS. 1 and 2 to minimize the number of components for the conversion and reconversion operations.

Therefore, the embodiment of the present invention illustrated in FIG. 3 combines the circuits of FIGS. 1 and 2 by including switching circuitry to select the appropriate performance mode.

Comparing FIGS. 1 and 3 it can be seen that the record path components of FIG. 1 have been reproduced across the top of FIG. 3 with the various components having the same reference numbers. The only addition in this path is the inclusion of 2 way switch 14 (e.g., Elantec EL4421), under the control of control unit 26, between YUV matrix amplifier 12 and A/D converter 16, with the operation of switch 14 discussed in detail below.

Similarly, by comparing FIGS. 2 and 3 it can be seen that the playback path of FIG. 2 has been reproduced in a little more convoluted way to that of the record path. Beginning in the lower right of FIG. 3 and the right side of FIG. 2 chroma decoder and sync separator 28 can be seen receiving the Y-C or composite TV signal followed by analog comparator 30 interfacing with control unit 26, instead of control unit 26' of FIG. 2 since, as stated above, the two control units are similar.

Now the signal path gets a little more convoluted. The YUV signal in path 29 is applied to the second input terminal of 2 way switch 14 and from there to the series connection of A/D converter 16 (instead of A/D converter 16'), memory 18 (instead of memory 18') and D/A converter 20 (instead of D/A converter 20'), all of which is possible as indicated above by the similarity of these components. The YUV signals on lines 21 are also applied to chroma encoder 22, and if chroma encoder 22 is operational, Y-C signals are applied to the VCR or the TV transmission line, if there is no action taken. To prevent that from occurring chroma encoder 22 can be inactivated by control unit 26. Further, if only the VCR option is being used, and there is no potential to apply the signals to a TV transmission line, the VCR will be in the playback mode in the reconvert operation, and therefore would not possibly record the Y-C signals if they were presented to it. In the playback or receive mode it should be noted that digital data insertion switch 19 between memory 18 and D/A 20 merely passes the signals therethrough without modifying them.

From this point in FIG. 3 the signal flow again resembles the flow in FIG. 2 more directly. From D/A converter 20 the YUV signals are applied to YUV to RGB matrix amplifier 24 and from there the RGB signals are applied to a second 2 way switch 32 (e.g., Elantec EL4421) under control of control unit 26 (also discussed in detail below) before being applied to the computer monitor. Similarly, in the record mode, while the YUV signals are also being applied to YUV to RGB matrix amplifier 24, those signals can not appear on the computer monitor connected to 2 way switch 32 since switch 32 is in the record mode position and not connected to transfer the RGB signal in path 25 to the computer monitor.

Thus, in operation in each mode, record and playback, the circuit of FIG. 3 operates the same as in each of FIGS. 1 and 2 with the exception of 2 way switches 14 and 32.

In the idle-record mode, the default position of switch 14 is the connection of YUV matrix amplifier 12 to A/D converter 16, and the default position of 2 way switch 32 is to connect the input computer video signal to the computer monitor. Thus this portion of 2 way switch 32 is between the computer video output connector (not shown) and the video-in connector of the monitor (not shown). This is done so that the operator can view the computer video that is being recorded as that is being performed by the upper path of FIG. 3.

Since both switches 14 and 32 are controlled by control unit 26, they are each set to the idle-record mode unless there is a Y-C signal applied to sync separator 28 and a format match is detected by the microprocessor of control unit 26. When that occurs the system of FIG. 3 goes into the playback mode with control unit 26 causing both switches 14 and 32 to switch position.

In the above manner the two modes, the idle-record mode and the playback-receive mode, may be automatically performed by a single circuit which eliminates substantial duplication of components. Specifically, this circuit eliminates the need for an additional A/D converter 16, memory 18, D/A converter 20, and control unit 26. Since memory 18 in the above example has at least 3 Megabytes of RAM, and control unit 26 provides sophisticated control functions, this is a substantial reduction in components and cost.

Further, the value of this combination may be viewed from a different perspective: in order to provide idle-record functionality to the design of a playback unit, only the addition of a clamp/sync separator 10, a YUV matrix amplifier 12, switches 14 and 32, and chroma encoder 22 is necessary. Similarly, to provide playback-receive functionality to the design of a recording unit, only the addition of switches 14 and 32, YUV to RGB matrix amplifier 24, and chroma decoder and sync separator 28 is necessary. Adding this additional functionality to existing units would be far more costly. As a result, it may be highly advantageous to have a combined recorder/player unit according to FIG. 3.

While the present invention has been described in several modes of operation and with exemplary routines and apparatus, it is contemplated that persons skilled in the art, upon reading the preceding descriptions and studying the drawings, will realize various alternative approaches to the implementation of the present invention. It is therefore intended that the following appended claims be interpreted as including all such alterations and modifications that fall within the true spirit and scope to the present invention and the appended claims.

What is claimed is:

1. A method for converting computer video signals to proprietary TV signals wherein said computer video includes N frames of data in the same time period that said proprietary TV signal occupies a single frame of data, and each of said computer video frames includes M lines of data, said method comprises the steps of:

a. converting said M lines of data in the first of said N frames of computer video to M lines of TV signals;

b. selecting two integer values, X=0 and Y=1;

c. writing lines (XM/N)+1 through (YM)/N of the M lines of TV signals of step a. into TV frame Y;

d. advancing X and Y each by 1 and repeating step c. if the value of Y is no greater than N; and e. repeating steps a. through d. for the next N frames of computer data.

2. A method as in claim 1 wherein said proprietary TV signals are reconverted to computer video signals, said method further includes the steps of:

f. sequentially reading the lines of data from N frames of said proprietary TV signals;

g. converting the lines of step f. in sequence into computer video signals; and h. repeatedly writing the converted data of step g. into N sequential computer video frames.

3. A method for converting computer video signals to proprietary TV signals wherein said computer video includes N frames of data in the same time period that said proprietary TV signal occupies a single frame of data, and each of said computer video frames includes M lines of data, said method comprises the steps of:

a. selecting three integer values, X=0, Y=1 and Z=N−1;

b. converting lines X+1 through (YM)/N of data in frame N−Z of computer video to M lines of TV signals;

c. writing lines X+1 through (YM)/N of the M lines of TV signals of step b. into TV frame Y;

d. advancing X, Y and Z each by 1 and repeating steps b. and c. if the value of Y is no greater than N; and e. repeating steps b. through d. for the next N frames of computer data.

4. A method as in claim 3 wherein said proprietary TV signals are reconverted to computer video signals, said method further includes the steps of:

f. sequentially reading the lines of data from N frames of said proprietary TV signals;

g. converting the lines of step f. in sequence into computer video signals; and h. repeatedly writing the converted data of step g. into N sequential computer video frames.

5. A converter to convert slow scan rate computer video to proprietary TV signals without the loss of video details, said computer video signals being in RGB format and said proprietary TV signals being in YUV format, wherein said computer video includes N frames of data in the same time period that said proprietary TV signal occupies a single frame of data, and each of said computer video frames includes M lines of data, said converter comprises:

a first matrix amplifier coupled to sequentially receive frames of data of said RGB computer video signals and to convert them into YUV formatted signals;

a memory coupled to said matrix amplifier to store said YUV formatted signals from said matrix amplifier; and a control unit coupled to said memory to selectively read YUV formatted signals from said memory to generate said proprietary TV signals by sequentially selecting a first of each group of said N frames of computer video as the source of data to be written into N frames of TV data with sequential M/N lines of data from the first computer video frame written sequentially into the N frames of TV data and the process being repeated for each subsequent N frames of computer video signals and N frames of TV video signals.

6. A converter as in claim 5 further comprises:

a first two way switch having two input ports and one output port to selectively connect signals from one of said input ports to said output port under control of said control unit, said first two way switch being placed between said first matrix amplifier and said memory, one of said input ports being connect to said first matrix amplifier to sequentially receive YUV formatted computer video signals when said converter is converting from computer video to TV video, the second of said input ports being disposed to sequentially receive YUV formatted TV video signals when said converter is converting from TV video to computer video, and said output port being couple to said memory;

a second matrix amplifier coupled to said memory to sequentially receive frames of data of said YUV TV video signals and to convert them into RGB formatted signals under control of said control unit when TV video signals is being converted to computer video signals; and wherein said control unit, when converting TV video signals to computer video signals, selectively reads YUV formatted signals from said memory to generate said frames of computer video signals by repeatedly, for each of said N frames of computer video signals, and sequentially selecting the lines from each of said N frames of TV video signals to reconvert said signals for each of said N frames of computer video, and the process being repeated for each subsequent N frames of TV video signals and N frames of computer video signals.

7. A converter to convert slow scan rate computer video to proprietary TV signals without the loss of video details, said computer video signals being in RGB format and said proprietary TV signals being in YUV format, wherein said computer video includes N frames of data in the same time period that said proprietary TV signal occupies a single frame of data, and each of said computer video frames includes M lines of data, said converter comprises:

a first matrix amplifier coupled to sequentially receive frames of data of said RGB computer video signals and to convert them into YUV formatted signals;

a memory coupled to said matrix amplifier to store said YUV formatted signals from said matrix amplifier; and a control unit coupled to said memory to selectively read YUV formatted signals form said memory to generate said proprietary TV signals by sequentially selecting lines X(M/N), for X=1 to X=N, from each group of said N frames of computer video as the source of data to be written sequentially into frames XN of TV data, respectively, and the process being repeated for each subsequent N frames of computer video and N frames of TV signals.

8. A converter as in claim 7 further comprises:

a first two way switch having two input ports and one output port to selectively connect signals from one of said input ports to said output port under control of said control unit, said first two way switch being placed between said first matrix amplifier and said memory, one of said input ports being connect to said first matrix amplifier to sequentially receive YUV formatted computer video signals when said converter is converting from computer video to TV video, the second of said input ports being disposed to sequentially receive YUV formatted TV video signals when said converter is converting from TV video to computer video, and said output port being couple to said memory;

a second matrix amplifier coupled to said memory to sequentially receive frames of data of said YUV TV video signals and to convert them into RGB formatted signals under control of said control unit when TV video signals is being converted to computer video signals; and wherein said control unit, when converting TV video signals to computer video signals, selectively reads YUV formatted signals from said memory to generate said frames of computer video signals by sequentially selecting the lines from each of the N frames of TV video signals as the source of data to be written repeatedly into each of the N frames of computer video signals, and the process being repeated for each subsequent N frames of computer video and N frames of TV signals.

* * * * *